(12) United States Patent
Harb et al.

(10) Patent No.: US 11,035,974 B1
(45) Date of Patent: Jun. 15, 2021

(54) DOWNHOLE RESISTIVITY IMAGING PAD WITH ELECTRICAL LEAKAGE PREVENTION

(71) Applicant: Baker Hughes Oilfield Operations LLC, Houston, TX (US)

(72) Inventors: Souhib Harb, Houston, TX (US);
Stanislav Forgang, Houston, TX (US);
Yi Liu, Houston, TX (US)

(73) Assignee: Baker Hughes Oilfield Operations LLC, Houston, TX (US)

( * ) Notice: Subject to any disclaimer, the term of this patent is extended or adjusted under 35 U.S.C. 154(b) by 0 days.

(21) Appl. No.: 15/931,326

(22) Filed: May 13, 2020

(51) Int. Cl.
*G01V 3/00* (2006.01)
*G01V 3/24* (2006.01)
*G01V 3/08* (2006.01)
*G01V 3/22* (2006.01)

(52) U.S. Cl.
CPC .............. *G01V 3/24* (2013.01); *G01V 3/083* (2013.01); *G01V 3/22* (2013.01)

(58) Field of Classification Search
CPC . G01V 3/24; G01V 3/08; G01V 3/083; G01V 3/18; G01V 3/20; G01V 3/22; G01V 3/00
See application file for complete search history.

(56) References Cited

U.S. PATENT DOCUMENTS

| | | | |
|---|---|---|---|
| 6,173,793 B1 | 1/2001 | Thompson | |
| 6,714,014 B2 | 3/2004 | Evans | |
| 7,382,136 B2 | 6/2008 | Hayman | |
| 7,388,382 B2 | 6/2008 | Strack | |
| 8,030,937 B2 | 10/2011 | Hu | |
| 8,030,938 B2 | 10/2011 | Bespalov | |
| 8,212,568 B2 | 7/2012 | Morys | |
| 8,614,579 B2 | 12/2013 | Forgang | |
| 8,760,167 B2 | 6/2014 | Bloemenkamp | |

(Continued)

FOREIGN PATENT DOCUMENTS

WO 2007/055786 5/2007

OTHER PUBLICATIONS

G. Itskovich, et al., "An Improved Resistivity Imager for Oil-Based Mud: Basic Physics and Applications," SPWLS 55th Annual Logging Symposium, May 18-22, 2014, pp. 1-13.

(Continued)

*Primary Examiner* — Son T Le
(74) *Attorney, Agent, or Firm* — Hogan Lovells US LLP

(57) ABSTRACT

A downhole electrical logging tool includes a mandrel, and a pad coupled to and radially extendable from the mandrel. The pad includes an isolated power supply configured to receive DC or AC power via the mandrel and convert the DC or AC power into one or more DC voltages for powering electronic components on the pad. The pad further includes a digital data processor (e.g., a microcontroller, field programmable gate array, or digital signal processor) powered by the isolated power supply, a transmitter electrode, and a sensing electrode. The pad also includes a housing in which the controller and isolated power supply are located, and a pad body coupled to the mandrel. Components inside the housing are electrically isolated from the pad body. The tool further includes a signal generator electrically coupled to the transmitter electrode to drive the transmitter electrode.

19 Claims, 4 Drawing Sheets

(56) References Cited

U.S. PATENT DOCUMENTS

| | | | |
|---|---|---|---|
| 8,901,932 B2 | 12/2014 | Hayman | |
| 8,972,193 B2 | 3/2015 | Bespalov | |
| 9,158,025 B2 | 10/2015 | Forgang | |
| 9,194,971 B2 | 11/2015 | Bloemenkamp | |
| 9,500,762 B2 | 11/2016 | Haramboure | |
| 9,897,715 B2 | 2/2018 | Donderici | |
| 9,903,977 B2 | 2/2018 | DiFoggio | |
| 2006/0103389 A1* | 5/2006 | Bespalov | E21B 47/002 324/338 |
| 2010/0026305 A1* | 2/2010 | Yanzig | G01V 3/20 324/355 |
| 2011/0025336 A1* | 2/2011 | Forgang | G01V 3/20 324/367 |
| 2014/0083771 A1* | 3/2014 | Clark | E21B 47/08 175/40 |
| 2017/0306744 A1* | 10/2017 | Chen | E21B 49/00 |
| 2019/0383139 A1* | 12/2019 | Kuhlman | E21B 47/017 |

OTHER PUBLICATIONS

Merchant et al., "Estimation of flushed zone and mudcake parameters using a new micro-resistivity pad device," 2006, https://www.onepetro.org/conference-paper/SPWLA-2006-UUU, 2 pages, abstract only.

* cited by examiner

DOWNHOLE RESISTIVITY IMAGING PAD WITH ELECTRICAL LEAKAGE PREVENTION

BACKGROUND

1. Field of the Invention

The present disclosure relates to downhole measurements. More particularly, the present disclosure relates to resistivity logging in wells with non-conductive drilling fluid.

2. Description of Related Art

During oil and gas operations, various types of logging may be performed to obtain properties of a well at many stages. One type of such logging is resistivity imaging. For resistivity imaging, a logging tool performs an electrical investigation of a borehole in which a voltage from an electrode is introduced in the formation from a tool inside the borehole. A measure current flows in a circuit that connects a source electrode to a measure/sensing electrode through the earth formation. Thus, various properties of the formation can be determined based on the measured electrical properties, such as resistivity. Some downhole applications need the resistivity logging tool to be able to take accurate measurements at low resistivity levels, such as 0.5 Ohm·m for example. However, conventional tools are not capable of accurately providing such low resistivity measurements largely due to electrical leakage that tends to occur between the pad electronics and the mandrel. Such leakage can cause erroneous and negative resistivity measurements.

SUMMARY

Applicants recognized the problems noted above herein and conceived and developed embodiments of systems and methods, according to the present disclosure.

In an embodiment, a downhole electrical logging tool includes a mandrel, and a pad coupled to and radially extendable from the mandrel. The pad includes an isolated power supply configured to receive DC or AC power via the mandrel and convert the DC (or AC) power into one or more DC voltages for powering electronic components on the pad. The pad further includes a digital data processor (e.g., a microcontroller, field programmable gate array, or digital signal processor) powered by the isolated power supply, a transmitter electrode, and a sensing electrode. The pad also includes a housing in which the controller and isolated power supply are located, and a pad body coupled to the mandrel. In some embodiments, the pad may be connected to the mandrel through an arm or other structure made from a non-conducting material. Components inside the housing are electrically isolated from the pad body. The tool further includes a signal generator electrically coupled to the transmitter electrode to drive the transmitter electrode. The signal generator may be located on the pad inside the housing and powered by the isolated power supply. Alternatively, in some embodiments, the signal generator may be located in the mandrel, and in such cases, the return terminal of the signal generator is not connected to the mandrel (i.e., "floating"). In some embodiments, the isolated power supply may be a switched-mode power supply. Other types of power supplies may be used, and with corresponding circuitry and components. Electronics inside the pad are electrically isolated from the pad body. This may be accomplished in various ways. For example, the electronics housing may be made of a non-conducting material. In some embodiments, an electrically isolating material may be placed between the pad body and the electronics housing. In some embodiments, the housing may be filled with an electrically isolating material. In some embodiments, an electrically isolating material can be utilized as housing for the electronics inside the pad. A space between the pad body and the housing may be filled with an electrically isolating material.

In another embodiment, a downhole operations system includes a tool string having one or more downhole tools, a conveyance member suspending the tool string downhole, and an electrical logging tool. The electrical logging tool includes a mandrel, and a pad coupled to and radially extendable from the mandrel. The pad includes an isolated power supply configured to receive DC or AC power via the mandrel and convert the DC or AC power into one or more DC voltages for powering electronic components on the pad. The pad further includes a digital data processor (e.g., a microcontroller, field programmable gate array, or digital signal processor) powered by the isolated power supply, a transmitter electrode, and a sensing electrode. The pad also includes a housing in which the controller and isolated power supply are located, and a pad body coupled to the mandrel. Components inside the housing are electrically isolated from the pad body. The tool further includes a signal generator electrically coupled to the transmitter electrode to drive the transmitter electrode. The signal generator may be located on the pad inside the housing and powered by the isolated power supply. Alternatively, the signal generator may be located in the mandrel. The isolated power supply may be a switched-mode power supply. The housing may be made of a non-conductive material. The housing may be filled with an electrically isolating material. A space between the pad body and the housing may be filled with an electrically isolating material.

In another embodiment, a method of performing resistivity imaging of a well includes positioning an electrical logging tool in a target region of a well, the target region having a formation, extending a pad of the logging tool outwardly from a mandrel of the logging tool into contact with the formation, powering electronics on the pad by a power supply located on the pad, emitting a voltage into the formation via transmission electrodes located on the pad, and detecting a current from the formation via sensing electrodes located on the pad. Alternatively, the signal generator may be located in the mandrel. The isolated power supply may be a switched-mode power supply. The housing may be made of a non-conductive material. The housing may be filled with an electrically isolating material. A space between the pad body and the housing may be filled with an electrically isolating material.

BRIEF DESCRIPTION OF DRAWINGS

The foregoing aspects, features, and advantages of the present disclosure will be further appreciated when considered with reference to the following description of embodiments and accompanying drawings. In describing the embodiments of the disclosure illustrated in the appended drawings, specific terminology will be used for the sake of clarity. However, the disclosure is not intended to be limited to the specific terms used, and it is to be understood that each specific term includes equivalents that operate in a similar manner to accomplish a similar purpose.

DETAILED DESCRIPTION

The foregoing aspects, features, and advantages of the present disclosure will be further appreciated when considered with reference to the following description of embodiments and accompanying drawings. In describing the embodiments of the disclosure illustrated in the appended drawings, specific terminology will be used for the sake of clarity. However, the disclosure is not intended to be limited to the specific terms used, and it is to be understood that each specific term includes equivalents that operate in a similar manner to accomplish a similar purpose.

When introducing elements of various embodiments of the present disclosure, the articles "a", "an", "the", and "said" are intended to mean that there are one or more of the elements. The terms "comprising", "including", and "having" are intended to be inclusive and mean that there may be additional elements other than the listed elements. Any examples of operating parameters and/or environmental conditions are not exclusive of other parameters/conditions of the disclosed embodiments. Additionally, it should be understood that references to "one embodiment", "an embodiment", "certain embodiments", or "other embodiments" of the present disclosure are not intended to be interpreted as excluding the existence of additional embodiments that also incorporate the recited features. Furthermore, reference to terms such as "above", "below", "upper", "lower", "side", "front", "back", or other terms regarding orientation or direction are made with reference to the illustrated embodiments and are not intended to be limiting or exclude other orientations or directions.

Embodiments of the present disclosure provide a resistivity logging tool with no or reduced electrical leakage between the pads electronics and the mandrel and pads body. The pad electronics are galvanically isolated from the mandrel by having an isolated DC/DC or AC/DC power supply implemented inside the pad. The output of this power supply is used to power all of the electronics on the pads, including a frequency generator also implemented inside the pad. This eliminates or reduces signal leakage that may get back into the main measuring loop by disconnecting possible leakage paths.

Figure 1:
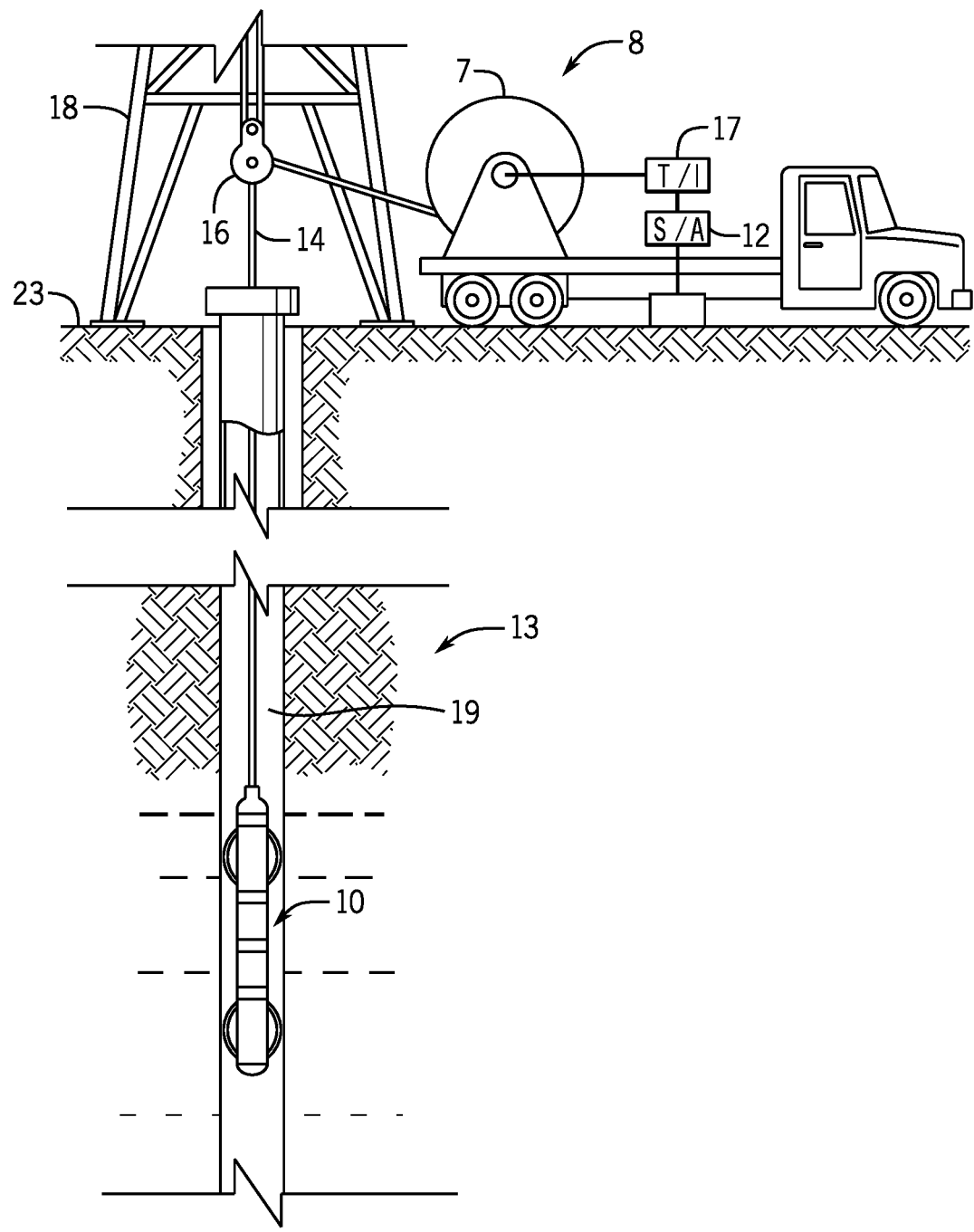
FIG. 1 is a schematic side view of an embodiment of a wireline system for electrical logging, in accordance with embodiments of the present disclosure.

FIG. 1 shows a resistivity imaging tool 10 suspended in a bore hole 19 that penetrates earth formations such as 13, from a suitable cable 14 that passes from drum 7 over a sheave 16 mounted on drilling rig 18. By industry standard, the cable 14 includes a stress member and seven conductors for transmitting commands to the tool and for receiving data back from the tool as well as power for the tool. In various embodiments, the resistivity imaging tool 10 is a part of a downhole tool or assembly (also referred to as the bottomhole assembly or "BHA") attached to the bottom end of the cable 14. Such a downhole assembly may include various tools, sensors, measurement devices, communication devices, and the like, which will not all be described for clarity. The resistivity imaging tool 10 is raised and lowered by draw works. The truck 8 includes electronics module 17, on the surface 23 that transmits the required operating commands downhole and in return, receives data back which may be recorded on an archival storage medium of any desired type for concurrent or later processing. The data may be transmitted in analog or digital form. Data processors such as a suitable computer 12, may be provided for performing data analysis in the field in real time or the recorded data may be sent to a processing center or both for post processing of the data.

Embodiments of the invention may be used in measurement-while-drilling (MWD), logging-while-drilling (LWD) or logging-while-tripping (LWT) operations. A slickline implementation of the invention is also possible in which the sensor assembly is conveyed downhole on a slickline, the data recorded on a suitable memory device, and retrieved for subsequent processing.

Figure 2:
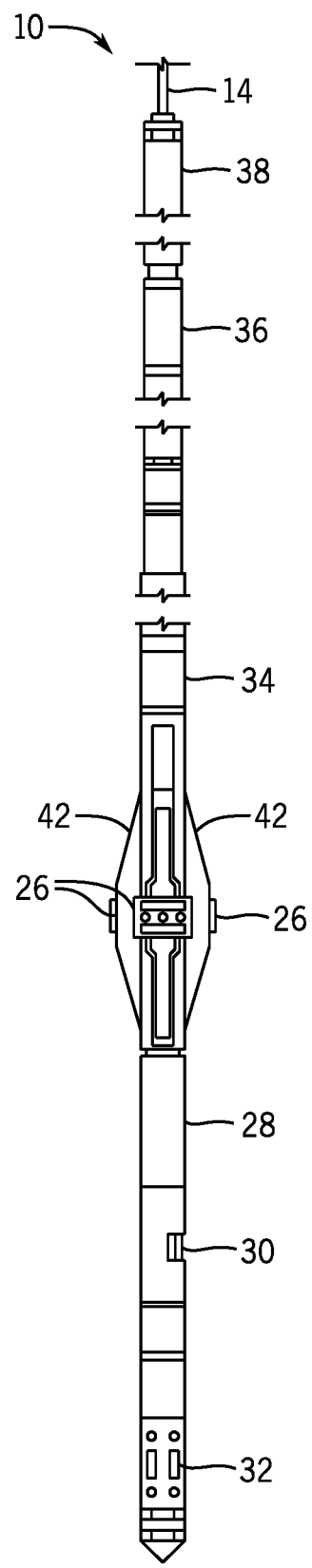
FIG. 2 illustrates the resistivity imaging tool, in accordance with example embodiments.

FIG. 2 illustrates the resistivity imaging tool 10 as suspended from cable 14, in accordance with example embodiments. The resistivity imaging tool 10 includes a mandrel 34 and a plurality of outwardly extendable measurement pads 26. The resistivity imaging tool 10 may optionally include a mud cell 30 and a circumferential acoustic televiewer 32. Electronics modules 28 and 38 may be located at suitable locations in the tool and not necessarily in the locations indicated. Various other components may be mounted on a mandrel 34. In some embodiments, the resistivity imaging tool 10 includes an orientation module 36 including a magnetometer and an accelerometer or inertial guidance system. The upper portion 38 of the tool 10 may contain a telemetry module for sampling, digitizing and transmission of the data samples from the various components uphole to surface electronics 12. If acoustic data are acquired, they are preferably digitized, although in an alternate arrangement, the data may be retained in analog form for transmission to the surface where it is later digitized by surface electronics 12.

In some embodiments, position guides such as bow-springs 42 help maintain the resistivity imaging tool 10 in a centralized position within a wellbore. The measurement pads 26 extend in a plurality of azimuthal directions to contact different sides of the wellbore. The number of measurement pads 26 may vary based on the tool 10 design, size of the well, and the like. The measurement pads 26 may be retracted towards the mandrel 34 when lowering or raising the tool 10 and extend radially outward to make contact with the walls of the well to conduct measurements. The mandrel 34 remains relatively centered in the well.

The external surface of a measurement pad 26 (alternatively referred to as a pad face) is positioned against the wellbore wall and accommodates one or more transmitting electrodes and one or more sensing electrodes. Specifically, each pad has a set of transmitting electrodes and sensing electrodes. The transmission electrodes may be driven at a high frequency voltage and inject the voltage into the formation. The sensing electrodes measure the current in the formation, which is converted from respective voltages into amplitude and phase values by comparison to a transmitter signal. In some embodiments, the complex data is sent in digital form by the tool downhole telemetry module to the surface for use in further data processing, for example estimation of real and imaginary components of impedance associated with the measurement pads. In some embodiments, raw data such as measured voltage and phase or impedance can be used to obtain imaging data.

Some downhole applications need the resistivity logging tool 10 to be able to measure at low resistivity levels. However, conventional tools are not capable of accurately providing such low resistivity measurements largely due to electrical leakage that tends to occur between the pad electronics and the mandrel. The leakage can cause erroneous and negative resistivity measurements. Embodiments of the present disclosure provide a resistivity logging tool with no or reduced electrical leakage between the pads and the mandrel. The pad electronics are galvanically isolated from the mandrel and pad's body by having, for example, an isolated DC/DC or AC/DC power supply implemented inside the pad. The output of this power supply is used to power all of the electronics on the pads, including a high frequency signal generator also implemented inside the pad. This eliminates or reduces signal leakage that may get back into the main measuring loop by disconnecting possible leakage paths.

Figure 3:
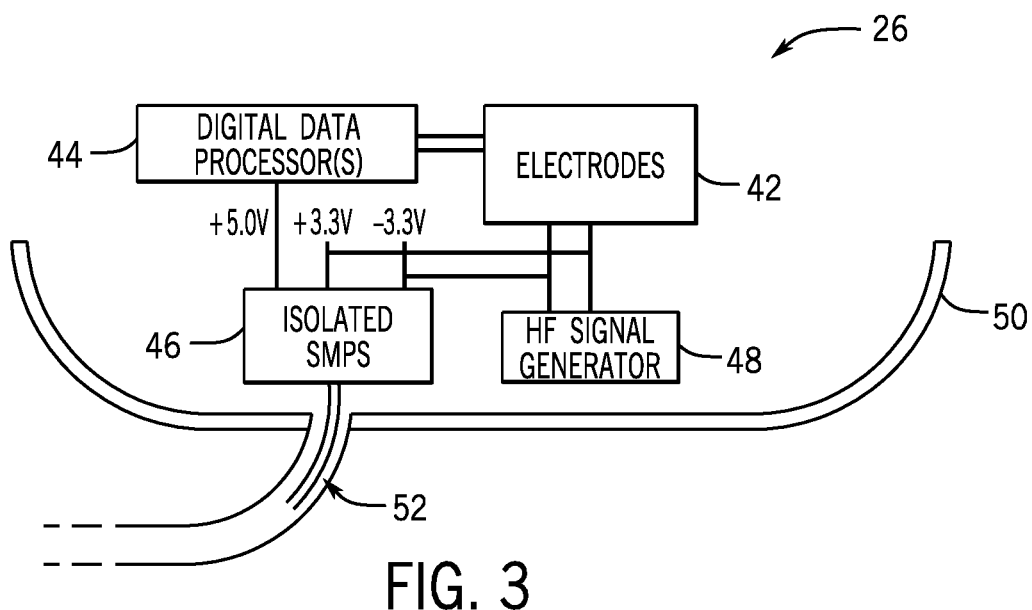
FIG. 3 illustrates a block diagram of the electronics on a measurement pad of the imaging tool, in accordance with example embodiments.

FIG. 3 illustrates a block diagram of the electronics on a measurement pad 26, in accordance with example embodiments. In some embodiments, the measurement pad 26 includes an isolated power supply 46, a digital data processor (e.g., a microcontroller, field programmable gate array, or digital signal processor) 44, electrodes 42, and a high frequency signal generator 48. The electrodes 42 include at least one transmitter electrode and at least one sensing electrode. The power supply 46 receives DC or AC power from the mandrel 34 (FIG. 2) and converts the DC or AC power into one or more DC voltages for powering electronic components on the measurement pad 26, such as the digital data processor 44, the electrodes 42, and the high frequency signal generator 48. In some embodiments, the isolated power supply 46 is a switched-mode power supply. Other types of power supplies may be used. In some embodiments, the power supply 46 on the measurement pad 26 receives power from the mandrel 34 via wires 52 extending into the measurement pad 26. Powering the electronics on the measurement pad 26 via the isolated power supply 46 onboard the measurement pad 26 rather than powering the electronics on the measurement pad 26 directly from the mandrel 34 reduces the amount of electrical leakage that may occur, as the pad circuitry is galvanically isolated from the mandrel 34. In some others embodiments, the high frequency signal generator 48 may be located on and powered from the mandrel 34 instead of on the measurement pad 26. In such embodiments, the return signal of the signal generator 48 is isolated from the ground signal of the mandrel (i.e., "floating").

Figure 4:
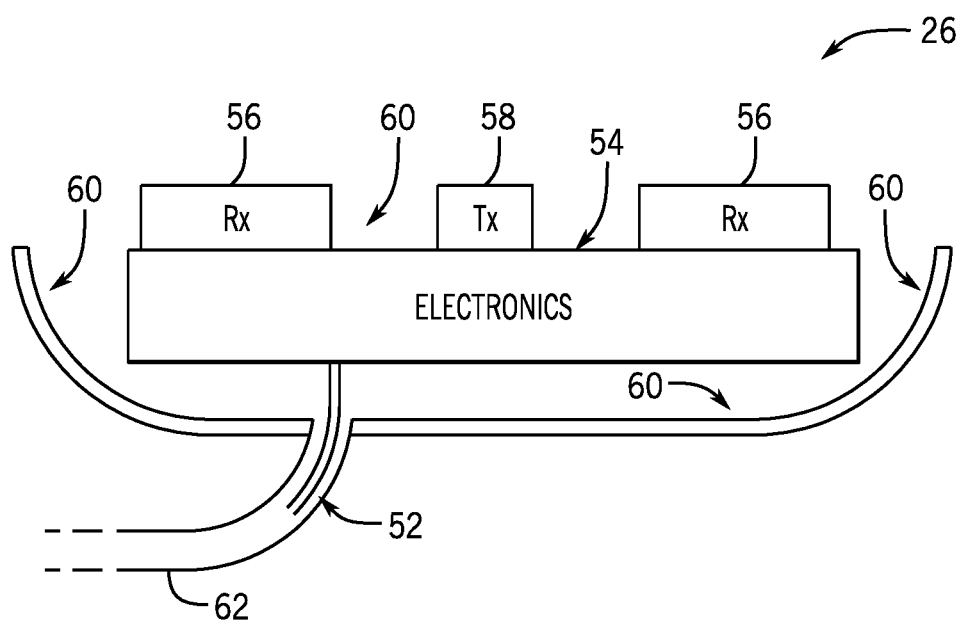
FIG. 4 illustrates a diagram of the measurement pad with physically isolated electronics, in accordance with example embodiments.

FIG. 4 illustrates a diagram of a measurement pad 26 with physically isolated electronics, in accordance with example embodiments. In some embodiments, the electronics may located within a housing 54. In some embodiments, there may not be an explicit housing. The pad body 50 is connected to the mandrel 34 by an arm 62 or other conveyance element. The transmission electrode 58 and sensing electrodes 56 are exposed to an environment outside of the housing 54 so that the electrodes 58, 56 can contact the wellbore formation to conduct measurements. In some embodiments, the housing 54 is made of a non-conductive material. In some embodiments, the housing 54 is filled with an electrically isolating material. In some embodiments, space 60 between the pad body 50 and the housing 54 is filled with an electrically isolating material. Any combination of these embodiments may be used. Having such physical electrical isolation further reduces electrical leakage that may otherwise occur.

Figure 5:
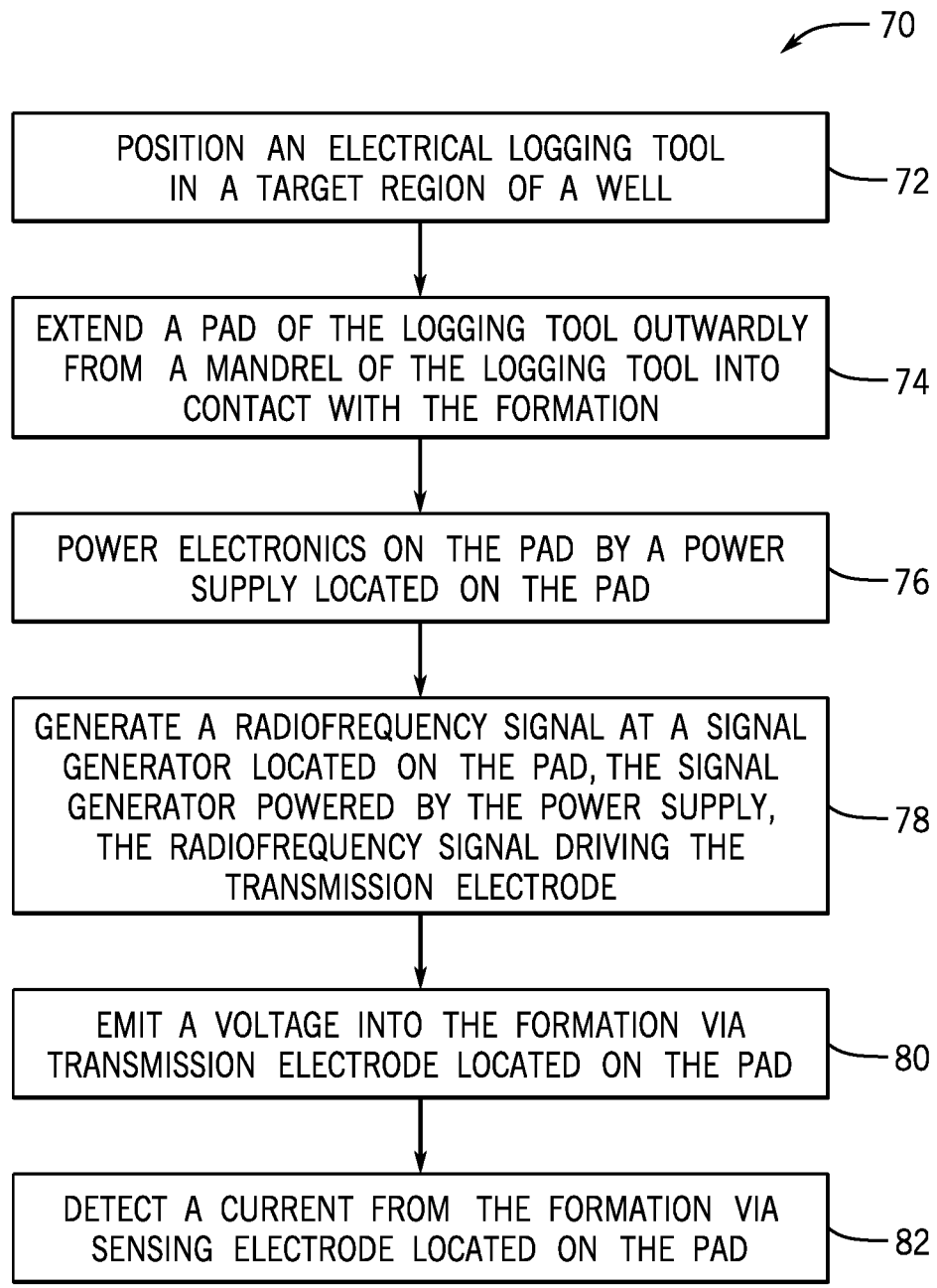
FIG. 5 illustrates a method of conducting resistivity imaging, in accordance with example embodiments.

FIG. 5 illustrates a method 70 of conducting resistivity imaging, in accordance with example embodiments. The steps described can be performed in any order, overlappingly, and with more or fewer steps than those discussed. In some embodiments, an electrical logging tool is positioned (72) in a target region of a well. The logging tool may be raised or lowered via a cable suspended from the surface. A pad of the logging tool is extended (74) outwardly from the mandrel of the logging tool into contact with the formation. Electronics on the pad is powered (76) by a power supply located on the pad. The power supply may be a DC/DC or AC/DC power supply that receives power from the mandrel and converts the received power into voltages used by the pad electronics. A high frequency signal is generated (78) by a signal generator located on the pad, which drives a transmission electrode on the pad. The signal generator is powered by the power supply located on the pad. A voltage is emitted (80) from the transmission electrode into the formation. A current is detected (82) in the formation by a sensing electrode located on the pad.

The foregoing disclosure and description of the disclosed embodiments is illustrative and explanatory of the embodiments of the invention. Various changes in the details of the illustrated embodiments can be made within the scope of the appended claims without departing from the true spirit of the disclosure. The embodiments of the present disclosure should only be limited by the following claims and their legal equivalents.

The invention claimed is:

1. A downhole electrical logging system, comprising:
   a mandrel; and
   a pad coupled to and radially extendable from the mandrel, the pad comprising:
      an isolated power supply configured to receive power via the mandrel and convert the power into one or more DC voltages for powering electronic components on the pad;
      a digital data processor powered by the isolated power supply;
      a transmitter electrode;
      a sensing electrode;
      a pad body coupled to the mandrel, wherein the isolated power supply is electrically isolated from the pad body; and
      a signal generator electrically coupled to the transmitter electrode.

2. The system of claim 1, wherein the signal generator is located on the pad and is powered by the isolated power supply.

3. The system of claim 1, wherein the signal generator is located in the pad.

4. The system of claim 1, wherein the isolated power supply is a switched-mode power supply.

5. The system of claim 1, wherein the pad further includes a housing that houses one or more electronics, the housing made of a non-conductive material.

6. The system of claim 1, wherein the pad further includes a housing that houses one or more electronics, the housing filled with an electrically isolating material.

7. The system of claim 1, wherein the pad further includes a housing that houses one or more electronics, and wherein a space between the pad body and the housing is filled with an electrically isolating material.

8. A downhole operations system, comprising:
   a tool string comprising one or more downhole tools;

a conveyance member suspending the tool string downhole; and an electrical logging system, comprising:
  a mandrel; and
  a pad coupled to and radially extendable from the mandrel, the pad comprising:
    an isolated power supply configured to receive power via the mandrel and convert the power into one or more DC voltages for powering electronic components on the pad;
    a digital data processor powered by the isolated power supply;
    a transmitter electrode;
    a sensing electrode;
    a pad body coupled to the mandrel, wherein the isolated power supply is isolated from the pad body; and
  a signal generator electrically coupled to the transmitter electrode.

9. The system of claim 8, wherein the signal generator is located on the pad and is powered by the isolated power supply.

10. The system of claim 8, wherein the signal generator is located in the pad.

11. The system of claim 8, wherein the isolated power supply is a switched-mode power supply.

12. The system of claim 8, wherein the pad further includes a housing that houses one or more electronics, and wherein the housing is made of a non-conductive material.

13. The system of claim 8, wherein the pad further includes a housing that houses one or more electronics, and wherein the housing is filled with an electrically isolating material.

14. The system of claim 8, wherein the pad further includes a housing that houses one or more electronics, and wherein a space between the pad body and the housing is filled with an electrically isolating material.

15. A method of performing resistivity imaging of a well, comprising:
  positioning an electrical logging tool in a target region of a well, the target region having a formation;
  extending a pad of the logging tool outwardly from a mandrel of the logging tool into contact with the formation;
  powering electronics on the pad by an isolated power supply located on the pad, wherein the power supply is a switched-mode power supply;
  emitting a voltage into the formation via transmission electrodes located on the pad; and
  detecting a current from the formation via sensing electrodes located on the pad.

16. The method of claim 15, further comprising:
  generating a high frequency signal at a signal generator located on the pad, the signal generator powered by the power supply, and the high frequency signal driving the transmission electrode.

17. The method of claim 15, wherein the electronics are located within a housing made of a non-conductive material.

18. The method of claim 15, wherein the electronics are located within a housing filled with an electrically isolating material.

19. The method of claim 15, wherein the electronics are located within a housing and a space between the pad body and the housing is filled with an electrically isolating material.

* * * * *